United States Patent [19]
von Rolbicki et al.

[11] Patent Number: 5,575,532
[45] Date of Patent: Nov. 19, 1996

[54] VEHICLE SEAT, IN PARTICULAR AN AIRPLANE PASSENGER SEAT

[75] Inventors: Wolfgang von Rolbicki, Bremen; Albert Strobel, Bermatingen, both of Germany

[73] Assignee: Keiper Recaro GmbH & Co., Remscheid, Germany

[21] Appl. No.: 336,098

[22] Filed: Nov. 4, 1994

[30] Foreign Application Priority Data

Nov. 6, 1993 [DE] Germany ............ 43 37 939.7

[51] Int. Cl.⁶ ..................................... A47C 7/02
[52] U.S. Cl. .................... 297/452.2; 297/232
[58] Field of Search .............. 248/188.1; 244/122 R, 244/118.6; 297/452.2, 452.18, 216.2, 232, 248, 216.16, 216.19, 216.1, 440.22

[56] References Cited

U.S. PATENT DOCUMENTS

| | | | |
|---|---|---|---|
| 3,785,600 | 1/1974 | Padovano | 297/248 X |
| 3,893,729 | 7/1975 | Sherman et al. | |
| 4,229,040 | 10/1980 | Howell et al. | 297/248 X |
| 4,375,300 | 3/1983 | Long et al. | 244/122 R X |
| 4,861,103 | 8/1989 | Vallee | 297/232 X |
| 4,911,381 | 3/1990 | Cannon et al. | 297/216.2 X |
| 5,069,505 | 12/1991 | Amthor et al. | |

FOREIGN PATENT DOCUMENTS

| | | |
|---|---|---|
| 0443065A1 | 8/1991 | European Pat. Off. . |
| 0530923A1 | 3/1993 | European Pat. Off. . |
| 2204076 | 8/1972 | Germany . |
| 3918500C2 | 12/1990 | Germany . |

*Primary Examiner*—Milton Nelson, Jr.
*Attorney, Agent, or Firm*—Wigman, Cohen, Leitner & Myers, P.C.

[57] ABSTRACT

A vehicle seat, in particular an airplane passenger seat, includes a front crosspiece which extends in crosswise direction to the seat, and a rear crosspiece arranged parallel to the front crosspiece. Both crosspieces are solidly connected with the upper end of at least two feet, and seat dividers also supported by the crosspieces. The rear crosspiece is designed as a profiled tube having longitudinal slots by which the seat dividers and the rear feet are connected. The front crosspiece's longitudinal slot is provided for the connection with the seat dividers, is open toward the rear crosspiece, has flanks extending parallel to each other, and slidingly receives in the direction of the slot depth, a front end-section of the seat dividers.

15 Claims, 3 Drawing Sheets

5,575,532

VEHICLE SEAT, IN PARTICULAR AN AIRPLANE PASSENGER SEAT

BACKGROUND OF THE INVENTION

The invention relates to a vehicle seat, in particular an airplane passenger seat.

A known airplane passenger seat is described in German Patent DE 22 04 076 A1, having frames with crosspieces which include an upper and a lower longitudinal slot, and all of these slots have a dovetail-shaped cross-section. The upper longitudinal slots serve the connection with the seat dividers, and the lower longitudinal slots serve the connection with the feet, whereby tension elements with a dovetail-shaped head engage the longitudinal slots and clamp the feet and the seat dividers together with the crosspieces. Exemplary of other airplane passenger seat frames is one described in U.S. Pat. No. 5,069,505, assigned to the assignee of the present invention. However, none of the prior art frames permit easy lateral adjustment of the spacing of the seats.

SUMMARY OF THE INVENTION

A primary object of the present invention is to provide vehicle seats with seat dividers slidable in the longitudinal direction of the crosspieces which permits the seat width and/or the number of individual seats to be changed. Another object of the present invention is to provide an airplane passenger seat having a frame with seat dividers or the like that can also be adjusted in the longitudinal direction of the crosspieces.

According to the present invention, the front crosspiece's longitudinal slot, open toward the rear crosspiece, into which the front end-section of the seat divider engages slidable in the direction of the slot depth, ensures that despite unavoidable variations, the seat dividers will not get jammed when sliding in the longitudinal direction of the crosspiece.

In a preferred embodiment, the seat frame includes a pair of crosspieces, each having a double-walled design. Such profiled tubes make it easily possible to provide the required longitudinal slots. In addition, these profiled tubes have a favorable relation between weight and stiffness. In this regard, one of the longitudinal slots of the rear crosspiece is open toward the top, i.e., toward the seat dividers.

In a preferred embodiment, the rear crosspiece's longitudinal slot is open toward the top and is delimited by the inside wall of the profiled tube. This inside wall extends more than 180 degrees concentrically to the longitudinal axis of the profiled tube and forms, joining this cylindrical section, two flank areas running parallel to each other. The distance between these flank areas is less than the inside diameter of the inside tube. This longitudinal slot open toward the top can therefore also receive bodies that produce a connection, interlocking in all crosswise directions, with the rear crosspiece.

The rear crosspiece is preferably flattened on its topside facing the seat dividers. If there is the possibility of the seat dividers lying directly against the rear crosspiece, the flattening provides for a relatively large support surface.

The seat dividers or the like, slidable in the crosspiece longitudinal direction, could lie on the flattened topside of the rear crosspiece with a sliding foil or the like placed between. Preferably, however, each of these seat dividers is connected with a sliding body that is arranged slidable in the longitudinal slot open toward the top. Such a sliding body is preferably guided in this longitudinal slot, open toward the top, crosswise to it and free from play.

Advantageous for the connection of the feet with the crosspieces are longitudinal slots that have a hammerhead-like cross-section shape, because then the required solid connection between the feet and the crosspieces can be produced easily with hammerhead bolts. Because the longitudinal slots only serve to provide the connection with the feet, the slots and the feet do not in any way impair the arrangement of the seat dividers or the like and, where necessary, their ability to slide in the crosspiece's longitudinal direction.

The cylindrical part of the rear crosspiece's longitudinal slot, open toward the top, and the front crosspiece's cylindrical inside wall, concentric to the outer wall, can receive extension pieces in telescopically slidable manner, as may be required when the dimensions of the seat are modifiable in crosswise direction to the seat. The locking devices required for locking the slidable seat dividers can also be fixed on the crosspieces. Such an arrangement of the locking devices is space-saving and requires no changes in the construction principle of the seat frame.

BRIEF DESCRIPTION OF THE DRAWINGS

The invention is explained in detail by reference to the embodiment shown in the drawings, wherein.

DETAILED DESCRIPTION OF A PREFERRED EMBODIMENT

Figure 1:
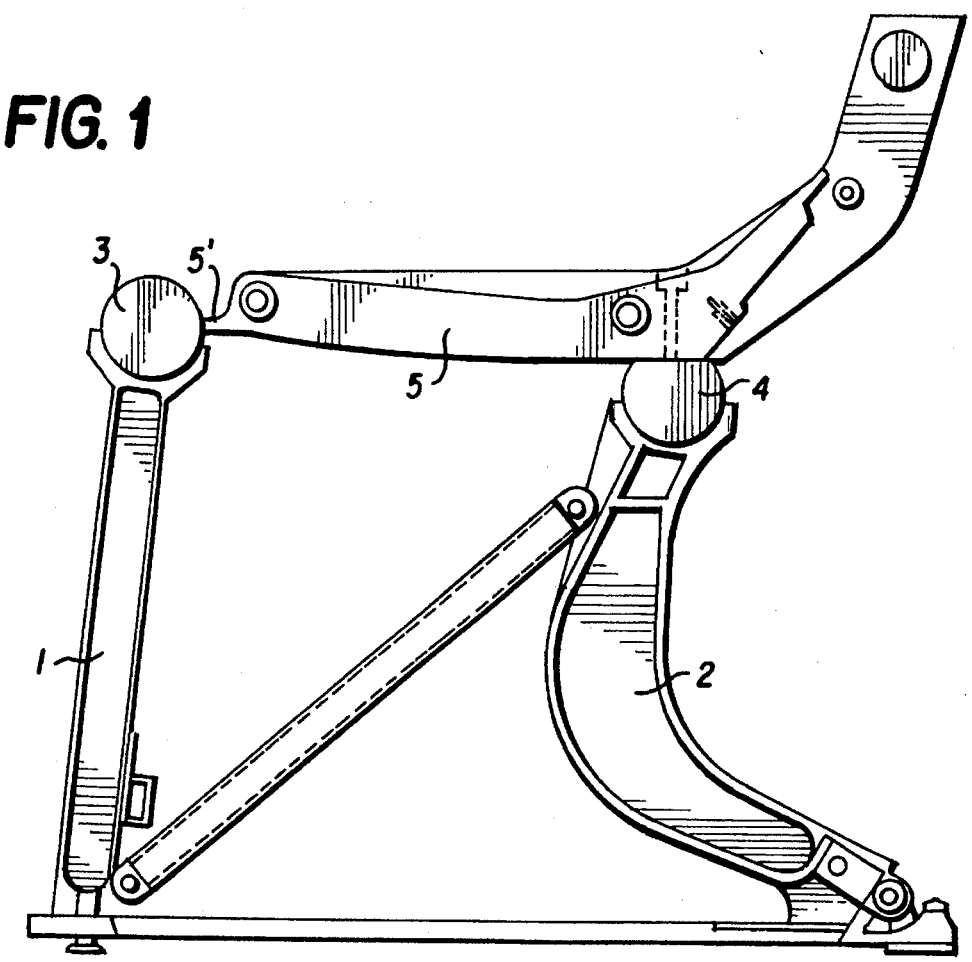
FIG. 1 is a side elevational view of the frame of a preferred embodiment without a seat-back cushion support.

Referring now to the drawings wherein like reference numbers indicate like parts, throughout the several views, in FIG. 1 there is shown a frame for an airplane passenger seat that can be converted from an arrangement of its three seats without intermediate spaces to an arrangement in which there is an intermediate space between each of the seats, and vice versa. The frame includes two front feet 1 and two rear feet 2 that can be connected in the area of their lower end with one of the rails or the other, which are fixed in the cabin floor. The upper end of each of the two front feet 1 is connected with a front crosspiece 3, and the upper end of each of the two rear feet 2 is connected with a rear crosspiece 4. These connections do not undergo any changes during a conversion of the seat from three to two seats or from two to three seats. Several so-called seat dividers 5 are connected with the front crosspiece 3 on the one hand and the rear crosspiece 4 on the other hand. These dividers serve as supports for the seat-backs, the eating tables provided on the seat-backs as well as for the armrests (not illustrated).

Figure 2:
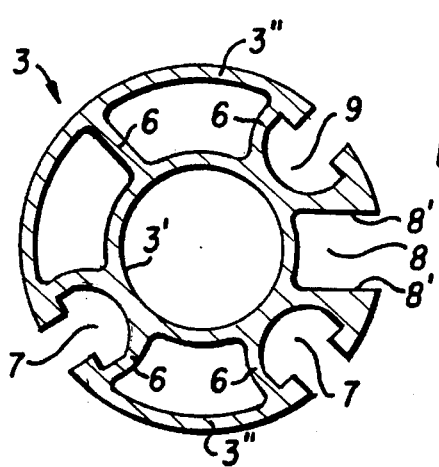
FIG. 2 is a cross-section of the front crosspiece.

As FIG. 2 shows, the front crosspiece 3 is a double-walled profiled tube. The inside wall 3' forms a completely closed tube concentric to the outer wall 3". Bridges 6 connect the inside wall 3' with the outside wall 3". A portion of these bridges 6 also serves as the lateral delimitation of longitudinal slots. Two longitudinal slots 7 open diagonally forward and downward, and diagonally rearward and downward, respectively, and have a hammerhead-like cross-section or profile. Slots 7 serve to receive hammerhead bolts (not shown) by means of which the tray-like designed upper end of the front feet 1 is solidly connected with the front crosspiece 3. A longitudinal slot 8 of front crosspiece 3 opens toward the rear, i.e., essentially toward the rear crosspiece 4, has flanks 8' lying parallel to each other, as shown in FIG. 2. Longitudinal slot 8 serves to receive, sliding in the direction of the slot depth, the front end-section 5' of the seat dividers 5. This front end-section 5' lies free from play against the flanks 8'. For those seat dividers 5 that are connected with and stationary relative to the two crosspieces 3 and 4, the front crosspiece 3 has a longitudinal slot 9 open diagonally toward the top and rear, which has the same hammerhead-like profile as the longitudinal slots 7. With the help of hammerhead bolts that engage the longitudinal slot 9, the stationary seat dividers can be solidly connected with the front crosspiece 3.

Figure 3:
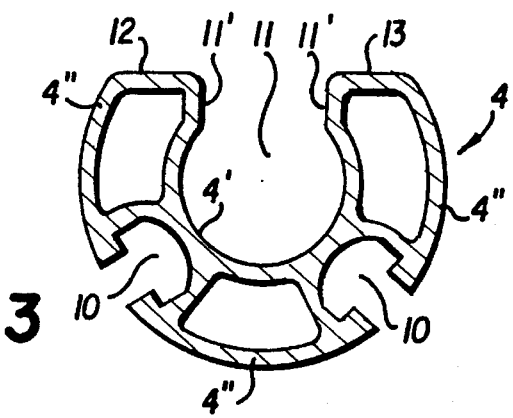
FIG. 3 is a cross-section of the rear crosspiece.

Referring to FIG. 3, the rear crosspiece 4, like the front crosspiece 3, is provided with a longitudinal slot 10 open diagonally forward and downward, and a longitudinal slot open diagonally rearward and downward, respectively. Into these longitudinal slots 10, hammerhead bolts engage by means of which the tray-like upper end of the rear feet 2 is solidly connected with the rear crosspiece 4.

As FIG. 3 also shows, the rear crosspiece 4 is flattened on the top. A longitudinal slot 11 open toward the top is aligned onto the middle of this flattening, in such a way that the flattening is subdivided into a front area 12 and a rear area 13. The inside wall 4' of the rear crosspiece lies, as is the case with the front crosspiece 3, concentrically to the outer wall 4". However, because of the longitudinal slot 10, it is only shaped cylindrically over an angle area of about 260 degrees. To this cylindrical portion are connected two flanks 11' extending vertically and parallel to each other. The distance between these flanks is less than the inside diameter of the rear crosspiece 4. The flanks 11' extend vertically to the two sections 12 and 13 of the flattening.

Figure 4:
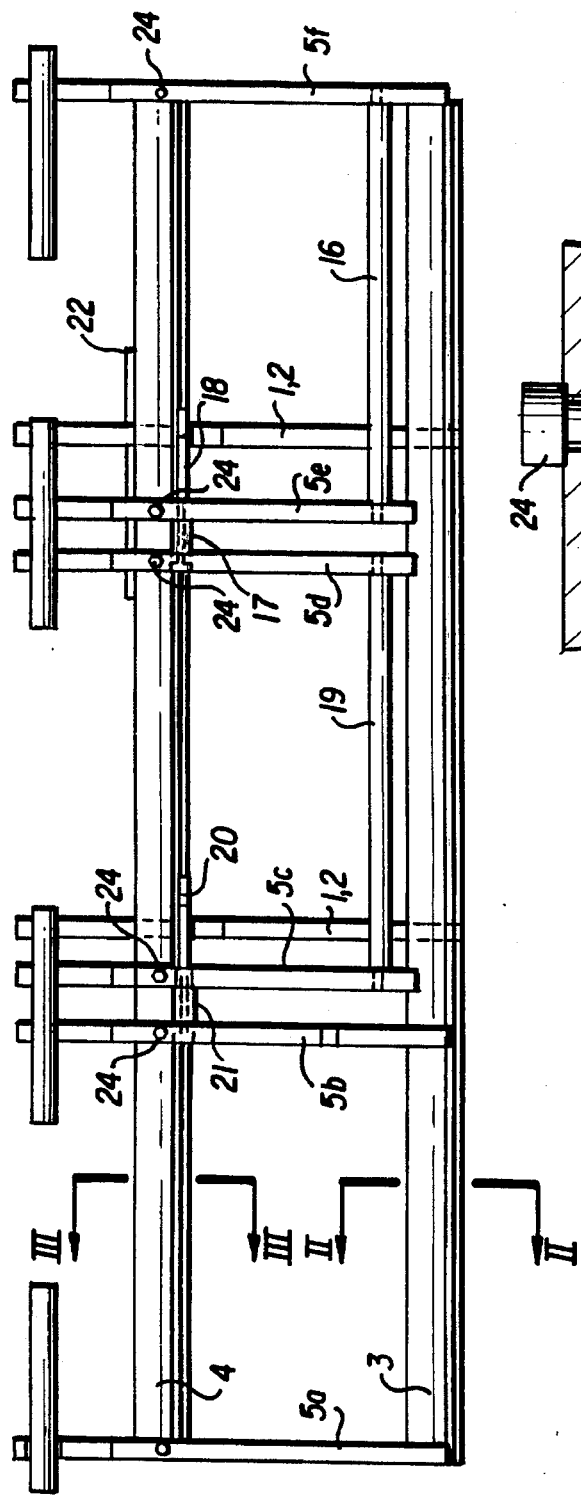
FIG. 4 is a plan view of the seat frame shown in FIG. 1 in the position of minimum extension in crosswise direction to the seat.
Figure 5:
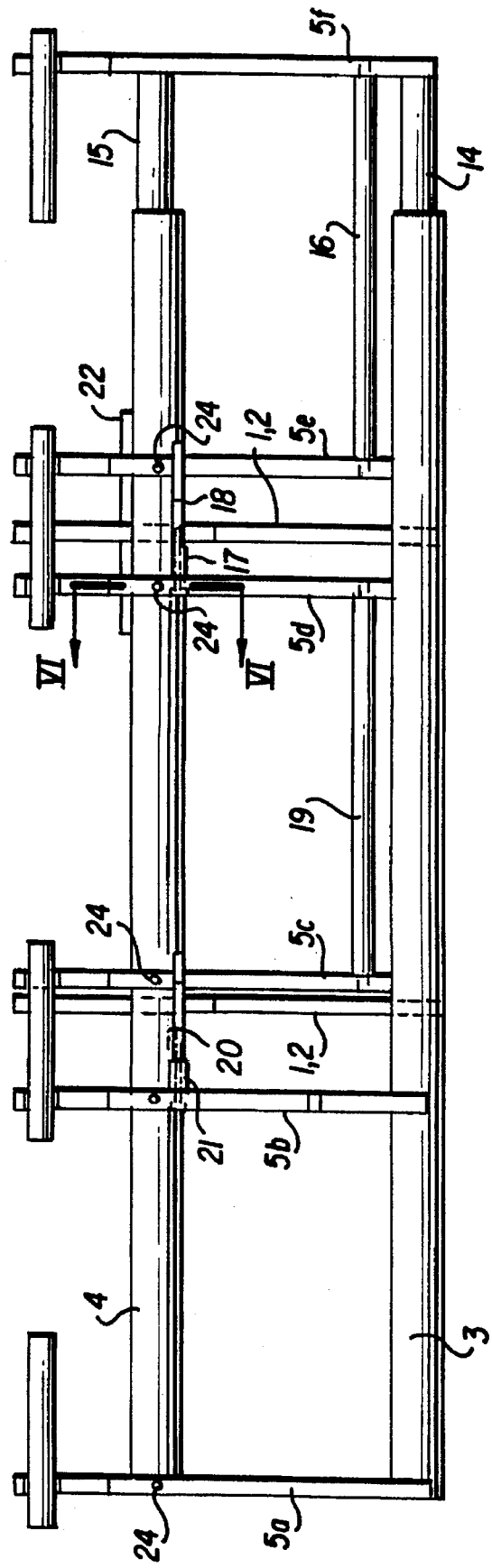
FIG. 5 is a plan view of the seat frame according to FIG. 4 in the position of maximum extension in crosswise direction to the seat.

Referring now to FIGS. 4 and 5, the seat divider 5a provided at the left end of the crosspieces 3 and 4 is solidly connected with the crosspieces 3 and 4. This also applies to the second seat divider 5b counting from the left end. The subsequent seat dividers 5c, 5d and 5e are, relative to the two crosspieces 3 and 4, slidable in their longitudinal direction. The seat divider 5f shown in FIGS. 7 and 8 on the right is solidly connected with a front telescopic tube 14 and a rear telescopic tube 15, which are guided, longitudinally slidable, in the front crosspiece 3 and in the rear crosspiece 4, respectively. To achieve an easy movability despite a confined guidance, in the sliding area of the two telescopic tubes 14 and 15, the inside wall 3' of the front crosspiece 3 and the inside wall 4' of the rear crosspiece 4 are coated with an easily sliding plastic. The telescopic tubes 14 and 15 can be similarly coated with plastic which permits easy sliding.

When the seat is to be brought from the setting shown in FIG. 4, in which there is no intermediate space between the seats, into the setting shown in FIG. 5, in which there is an intermediate space between each of the seats, the seat divider 5f is pulled toward the right in a viewing direction according to FIG. 4. A connection pole 16 between it and the seat divider 5e causes the latter to move synchronously with the seat divider 5f. The seat divider 5e first moves away from the seat divider 5d, whose minimum distance is fixed by a spacer sleeve 17, until a tow rod 18 connecting both seat dividers becomes active and moves the seat divider 5d to the right as seen in a viewing direction according to FIGS. 4 and 5. The seat divider 5d moves to the same extent the seat divider 5c connected with it via a connecting rod 19, until a path-limiting rod 20 supporting a spacer sleeve 21 fixing the minimum distance between the seat dividers 5d and 5c prevents further sliding.

To return to the setting in which there is no intermediate space between the two seats, the seat divider 5f connected with the telescopic tubes 14 and 15 only needs to be slid up to the stop at the two crosspieces 3 and 4 and against these crosspieces. In the process, the connecting rods 16 and 19 and the spacer sleeves 17 and 21 ensure that the seat dividers 5e, 5d and 5c go back into the position shown in FIG. 4.

A locking device 22, shown only in diagram form, fixed on the rear crosspiece 4 locks the slidable seat divider 5e, over it the slidable seat dividers 5c and 5d, and also the telescopic tubes 14 and 15 in both end positions. Locking device 22 is operated via braces (not shown) that are guided to an operating bar provided on the seat divider 5f connected with the telescopic tubes 14 and 15. As FIGS. 4 and 5 show, the feet 1 and 2 do not change their position during a conversion from two to three seats and vice versa.

Figure 6:
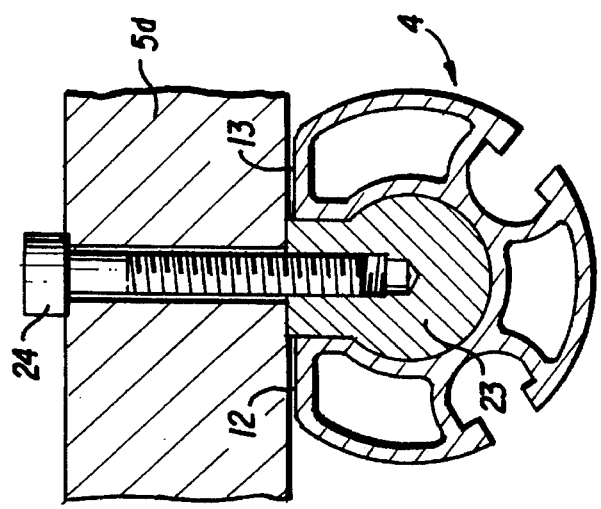
FIG. 6 is a sectional view taken along line VI—VI of FIG. 5.

As shown in FIG. 6, the slidable seat dividers 5c, 5d and 5e are each supported by a sliding body 23 made of a plastic having good sliding characteristics. Body 23 is guided in the longitudinal direction of the rear crosspiece 4 into its longitudinal slot 11 open toward the top. Identically shaped sliding bodies 23 have a cross-section shape corresponding to the cross-section shape of the longitudinal slot 11 (FIG. 3). They are therefore guided free from play and produce an interlocking connection in all crosswise directions, between the seat dividers and the rear crosspieces 4. As FIG. 6 also shows, the sliding body 23 holds the seat divider, connected with it by means of a bolt or screw 24, for example, at a slight distance over the two areas 12 and 13 of the flattening of the rear crosspiece 4, in such a way that no friction can occur between the seat divider and the flattening.

With a sufficient axial length of the sliding bodies 23, they cannot get jammed during sliding of the seat dividers in the longitudinal direction of the crosspieces. In addition, the front end-section 5' of the slidable seat dividers 5c, 5d and 5e can balance out variations in the distance between the two crosspieces 3 and 4 as well as in the length of the seat dividers measured in this direction, such that, the seat dividers cannot get jammed.

When the two seat dividers 5a and 5b are solidly connected with the crosspieces 3 and 4, instead of a sliding body 23a tension body engages the longitudinal slot 11. When a tension bolt is tightened, this tension body presses the seat divider against the front area 12 and the rear area 13 of the flattening of the rear crosspiece 4. In addition, one can provide, at the front end of these seat dividers 5a and 5b, an extension that lies against the front crosspiece 3 in the area of the longitudinal slot 9 and that, by means of a tension bolt engaging the longitudinal slot 9, is solidly connected with this crosspiece.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed:

1. A vehicle seat, in particular an airplane passenger seat, comprising: a front crosspiece, first and second seat dividers, a rear crosspiece arranged parallel to the front crosspiece, and at least two feet each having a lower end and an upper end, both crosspieces being solidly connected with the upper end of said feet, said first seat dividers supported by the crosspieces, said crosspieces being profiled tubes with longitudinal slots for solidly connecting said first seat dividers and said feet, said longitudinal slots each having a depth, said front crosspiece being provided with an additional longitudinal slot which is open toward the rear crosspiece and includes parallel flanks for slidingly receiving therein in the direction of the slot depth a front end-section of said second seat dividers slidable in the longitudinal direction of said crosspieces.

2. The vehicle seat according to claim 1, wherein both crosspieces have a double-wall and one of the longitudinal slots of the rear crosspiece is open toward the top of said rear crosspiece.

3. The vehicle seat according to claim 2, wherein each seat divider is connected with a sliding body that is arranged in the longitudinal slot open toward the top of said rear crosspiece.

4. The vehicle seat according to claim 3, wherein the sliding body is securely positioned in and crosswise to the longitudinal slot open toward the top of said rear crosspiece.

5. The vehicle seat according to claim 4, wherein the front and rear crosspieces are profiled tubes with an outer wall and an inner wall and the longitudinal slots of the front and rear crosspieces have a hammerhead-like cross-section for connection with the feet, whereby a part of each wall delimiting one of said slots is formed by the inside wall of the profiled tube and a part is formed by the cross-bridges between the inside wall and the outer wall.

6. The vehicle seat according to claim 5, wherein the crosspieces have bearing surfaces which are coated at least in part with a plastic having good sliding properties.

7. A vehicle seat, in particular an airplane passenger seat, comprising: a front crosspiece, a rear crosspiece arranged parallel to the front crosspiece, and at least two feet each having a lower end and an upper end, first and second seat dividers, both crosspieces being solidly connected with the upper end of said feet, said first seat dividers supported by the crosspieces, said crosspieces being profiled tubes with longitudinal slots for connecting said first seat dividers and said feet, said from crosspiece being provided with a longitudinal slot which is open toward the rear crosspiece and includes parallel flanks for slidingly receiving therein a front end-section of said second seat dividers, wherein both crosspieces have a double-wall and one of the longitudinal slots of the rear crosspiece is open toward the top of said rear crosspiece, and wherein said one of said longitudinal slots is delimited by inside wall of said rear crosspiece, which wall extends more than 180 degrees concentrically to the longitudinal axis of said rear crosspiece.

8. The vehicle seat according to claim 7, wherein the rear crosspiece has a flattened top surface facing the seat dividers, and said one of said longitudinal slots is delimited by two flank areas whose distance from each other is less than an inside diameter of an inside tube defined by the inside wall.

9. The vehicle seat according to claim 8, wherein said one of said longitudinal slots in said rear crosspiece is positioned in the middle of said flattened top surface.

10. The vehicle seat according to claim 8, wherein the from and rear crosspieces are profiled tubes with an outer wall and an inner wall and the longitudinal slots of the front and rear crosspieces have a hammerhead-like cross-section for connection with the feet, whereby a part of each wall delimiting one of said slots is formed by the inside wall of the profiled tube and a part is formed by cross-bridges between the inside wall and the outer wall.

11. The vehicle seat according to claim 10, wherein the crosspieces have bearing surfaces which are coated at least in part with a plastic having good sliding properties.

12. A vehicle seat, in particular an airplane passenger seat, comprising: a front crosspiece, a rear crosspiece arranged parallel to the from crosspiece, and at least two feet each having a lower end and an upper end, first and second seat dividers, both crosspieces being solidly connected with the upper end of said feet, said first seat dividers supported by the crosspieces, said crosspieces are profiled tubes with longitudinal slots for connecting said first seat dividers and said feet, said front crosspiece is provided with a longitudinal slot which is open toward the rear crosspiece and includes parallel flanks for slidingly receiving therein a front end-section of said second seat dividers, wherein both crosspieces have a double-wall and one of the longitudinal slots of the rear crosspiece is open toward the top of said rear crosspiece, and wherein other of the longitudinal slots of the front and rear crosspieces have a hammerhead-like cross-section for connection with the feet, and wherein the walls delimiting each of these slots are formed partly by an inside wall of said crosspiece and partly by crossbridges between said inside wall and an outer wall of said crosspiece.

13. The vehicle seat according to claim 12, wherein said inside wall of said front crosspiece and said inside wall of said rear crosspiece each delimits a channel receiving an extension piece in a telescopically sliding manner.

14. The vehicle seat according to claim 13, wherein the crosspieces have surface areas serving as bearing surfaces, said bearing surfaces coated at least in part with a plastic having good sliding properties and bear a front section and sliding bodies of movable seat dividers and extension pieces.

15. The vehicle seat according to claim 14, wherein the rear crosspiece is provided as a support for a locking device for the seat dividers slidable in the longitudinal direction of said rear crosspiece.

* * * * *